Sept. 30, 1958  J. A. KILE ET AL  2,854,109
COMBINED DRIVE AND BRAKE MECHANISM
Filed Dec. 3, 1953

INVENTORS
JOHN A. KILE
RALPH C. KILE
ELIJAH S. KILE
WILLIAM J. KOSKA
BY
Williamson, Williamson, Schroeder, & Adams.
ATTORNEYS

United States Patent Office 2,854,109
Patented Sept. 30, 1958

2,854,109

COMBINED DRIVE AND BRAKE MECHANISM

John A. Kile and Ralph C. Kile, St. Cloud, Elijah S. Kile, Waite Park, and William J. Koska, St. Cloud, Minn., assignors to Nationwide Sales Corporation, St. Cloud, Minn., a corporation of Minnesota Application December 3, 1953, Serial No. 395,872

3 Claims. (Cl. 192—8)

This invention relates to a combined drive and brake mechanism and more particularly to a winch drive which has automatic braking properties.

We are aware of many old devices which have been proposed for setting brakes on such equipment as winches and the like after the apparatus has been used for driving a winding drum or other similar element. One such simple and old device is the ratchet wheel coupled with a pivotally mounted pawl adjacent the ratchet. The driving member on such a device may be a manually operable crank or the like. The pawl merely rides over the top of the ratchet teeth as the driving member is actuated. However, upon release of the driving force upon the driving member, the pawl will engage a ratchet tooth and prevent reverse movement of the driven portion of the apparatus. This fundamental and old braking mechanism is uncertain and unsafe in that the pawl may wear and sometimes become disengaged from the ratchet teeth during use. Once the pawl becomes disengaged, the braking mechanism is completely inoperative and accidents often result.

Other old winch devices have separate mechanisms, one for driving the apparatus and the other independently operable to brake the mechanism. Such devices required the separate attention of an operator and often proved complicated and costly. Most of the prior art devices relating to mechanisms for driving and braking are capable of working in only one direction in addition to the above noted disadvantages.

This invention contemplates a mechanism which will require no separate steps to accomplish the braking as opposed to the driving but, on the contrary, will give an instantaneous and simultaneous braking whenever the driving force is released. The foregoing is accomplished while driving either in a forward or backward direction and where the resisting force on the driven element is either in a forward or backward direction.

It is therefore an important object of the invention to provide a drive and brake mechanism which is simple and positive in action, the braking force being automatically applied exactly as soon as the driving force is removed.

It is another object of the invention to provide a multiple function drive and brake mechanism which will permit forward and rearward driving force, the applied force serving to release the braking force which is constantly conditioned to operate whenever the driving force is not applied.

It is a further object of the invention to provide an economical and novel means for both driving and braking a driven mechanism such as a winch, the applied force being transmitted through the ends of an expandable brake shoe so as to release braking force simultaneously with the application of driving force.

It is another object of the invention to provide a device of the class described in which the brake shoe is not only released from normal braking position upon application of driving force but, upon relaxation of the driving force and upon force applied to the driven member will more firmly set the brake mechanism in accordance with the amount of force applied to the driven member while the device is in a state of rest.

It is a still further object of the invention to provide novel interconnection radially between a driven shaft and a driving member, the interconnecting means serving a multiple purpose to release braking tension supplied by a brake shoe, while at the same time establishing a driving connection to the driven shaft, and alternately to supply wedging action upon release of the driving force and application of force from the driven side of the apparatus, so as to expand said brake shoe and prevent further movement of the driven member.

These and other objects and advantages of our invention will more fully appear from the following description made in connection with the accompanying drawings wherein like reference characters refer to similar parts throughout the several views and in which.

Figure 1:
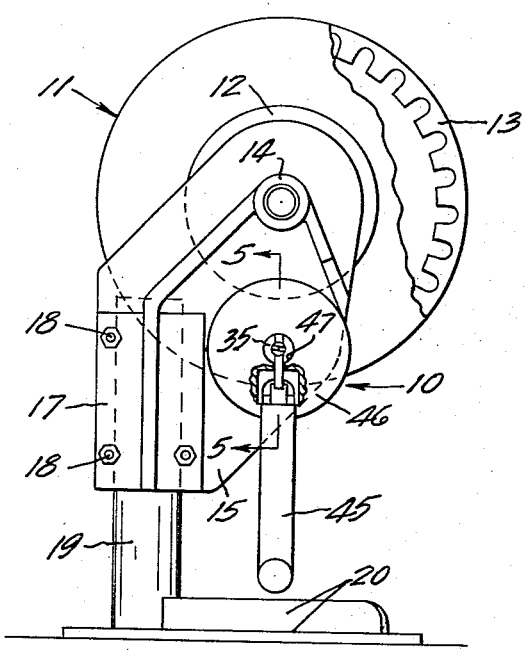
Fig. 1 is a side elevation of our drive and brake mechanism embodied in a winch apparatus, portions of the apparatus being cut away to better show the internal structure thereof.
Figure 2:
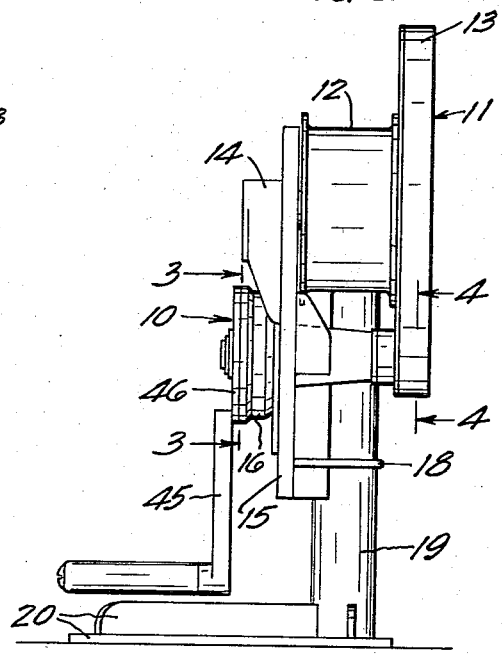
Fig. 2 is a front elevation of the invention.

Referring now to the drawing, our invention comprises a drive and brake mechanism indicated generally at 10 which may be coupled with such apparatus as a winch device indicated generally at 11. The winch device 11 may constitute a drum 12 which is axially mounted to a gear housing 13 and a bearing 14 which in turn forms a part of the mounting piece 15 which includes the brake drum 16 to be described hereinafter. The mounting structure 15 may have a bracket 17 which is adjustably securable by such means as U-bolts 18 to a standard 19. The standard 19 may, in turn, be secured to a rigid base 20 as shown. It is to be understood that the winch apparatus may be greatly varied in its structure and that other apparatus of a type adapted to have power transmitted thereto through a rotating shaft system may also be adapted to our invention.

The combined drive and brake mechanism 10 has an annular brake drum 16 which may be secured to, or form a part of, the supporting structure which supports the driven member, such as the winch drum or spool 12. The brake drum 16 is preferably cylindrical in shape and has an internal annular braking surface 21 as shown in Figs. 3 and 5, the cylindrical portion defining a recess 22 which extends rearwardly to the plate 23 which may be secured to the supporting structure 15 by such means as bolts 24.

Figure 3:
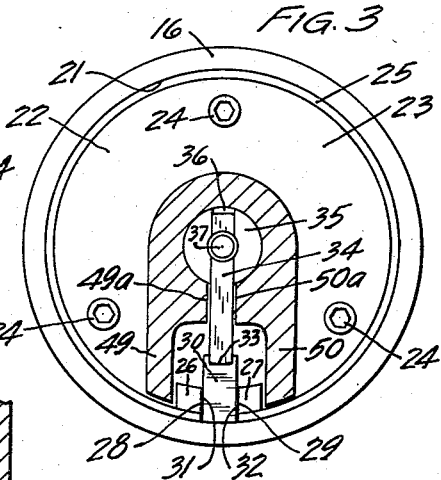
Fig. 3 is a vertical section of the drive and brake mechanism taken on the line 3—3 of Fig. 2, the position of the wedging member and radial arm being neutral without force applied in either direction.

An arcuate brake shoe 25 lies annularly within the space 22 and normally is in braking engagement throughout the greater portion of the cylindrical and annular surface as shown in Fig. 3. The brake shoe 25 preferably has an outwardly tensioned spring quality which normally causes the brake shoe to press against the annular braking surface 21 when no outside force is applied thereto. The arcuate shoe 25 terminatees at each end in abutments 26 and 27 respectively. The abutments are rigidly formed with respect to the ends of brake shoe 25 and lie in spaced relation as shown in Fig. 3. The end surfaces of the abutments 26 and 27 are preferably flat as shown at 28 and 29 and are generally disposed radially to the axis of the brake drum 16 as shown.

Disposed between the abutments 26 and 27 is a wedging member 30, having flat sides 31 and 32 disposed for engagement with the flat surfaces 28 and 29 of the abutment members 26 and 27. When the brake shoe 25 is in outwardly expanded and normal position, the wedging member 30 will be loosely received in the space between the abutments. The clearance between the wedging member 30 and the abutments 26 and 27 is not critical in nature but should be sufficient so that closing the clearance will release the braking tension between brake shoe 25 and brake drum 21 and, on the other hand, should not be so great that the member 30 may be rocked to a pronounced degree before wedging between the abutments or that it fails entirely to function as a wedging member. For practical purposes we have found that from $\frac{1}{32}$ to $\frac{1}{16}$ of an inch is an appropriate clearance where the brake drum is in the neighborhood of 4 or 5 inches in diameter.

Figure 4:
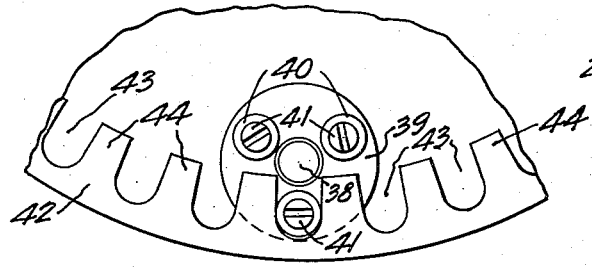
Fig. 4 is an enlarged detail of the gear drive interconnecting the drum element with the drive and brake mechanism.
Figure 5:
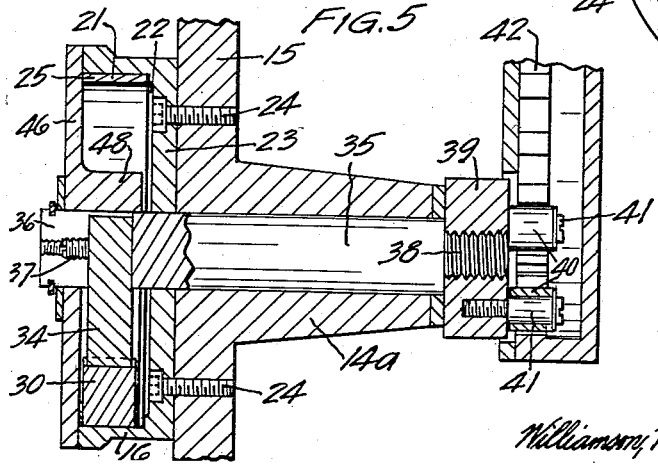
Fig. 5 is a vertical section of the drive and brake mechanism taken on the line 5—5 of Fig. 1.

At the radially innermost surface of the wedging member 30 is formed a recess 33 which is adapted to engage in a pivotal or rockable fashion a radial arm 34 which in turn is rigidly secured to a driven shaft 35 as shown in Figs. 3 and 5. The radial arm 34 may be secured to the shaft 35 by means of a slot 36 formed diametrically in the outer end of the driven shaft 35 and held in position by a set screw 37 which is threadably engaged axially of shaft 35 so as to bind and clamp against the radial arm 34. The driven shaft 35 extends through bearing 14a and has a threaded reduced end 38 to which is attached a nut 39. Additional locking means (not shown) may be employed to prevent the nut from becoming unscrewed. A plurality of roller elements 40 may be circularly disposed with respect to the axis of shaft 35 and rotatable on pins 41 which are threadably engaged with nut 39 at the outward face thereof, the axis of each of the individual pins 41 lying in parallel relation to the axis of shaft 35. The roller members 40 are engageable with a gear 42 having internal slotted portions 43 as shown in detail in Fig. 4, the gear slots 43 and interposed gear teeth 44 being engageable by the roller elements 40 to cause the gear 42 to revolve about its axis which is concurrent with that of the drum or spool 12 and in driving connection therewith.

A driving means such as the manual crank 45 has a plate 46 with a central opening 47 adapted to be inserted over the outer end of shaft 35 as shown in Figs. 1 and 5. The plate 46 has a boss 48 which provides a double driving connection at portions 49 and 49a, and at 50 and 50a, as shown in cross section in Fig. 3. The boss members 49 and 50 lie in spaced relation on the plate 46 so as to be engageable respectively with abutments 26 and 27 when the handle is placed in position with the opening 47 over the end of shaft 35 as shown in Figs. 1, 2, 3, and 5. Likewise portions 49a and 50a lie in comparable spaced relation with respective sides of arm 34. It is to be noted that the driving means is mounted axially of the drive and brake mechanism and thereby is mounted on a common axis with the brake drum and brake shoe as shown in Fig. 3. The drive means is mounted for limited rotation upon the driven shaft 35 and at no time has driving connection with the shaft except through radial arm 34 and one of portions 49a or 50a.

In the operation of our combined drive and brake mechanism, we rotate the driving means such as manual handle 45 in either direction to effect several simultaneous functions as follows: First, assuming that the handle 45 is rotated in a counterclockwise direction as viewed in Fig. 3, the boss 49 will engage the rear of abutment 26, closing the small clearance which exists between abutments 26 and 27 and the wedging member 30. This will cause the brake shoe 25 to be released from binding engagement against the braking surface 21 and allow free rotation of the handle as well as the brake shoe within the brake drum 16. The abutment 26 in turn bears against the wedging member 30, causing it to become firmly wedged between abutments 26 and 27, while at the same time imparting a radial driving force, by contact between the portion 49a and radial arm 34, to the driven shaft 35. This driving force is further communicated through the gearing system previously described to the drum or spool 12 which may in turn impart a winding movement if desired to such further apparatus (not shown) as a cable or a flexible line. Since the arrangement of parts in the combined drive and brake mechanism can be made symmetrical as shown, the same driving force can be applied if the driving means is caused to rotate in a clockwise direction. In this instance, the boss 50 will bear against abutment 27 which in turn will loosen to some degree the binding tension of the brake shoe 25 and, at the same time, the portion 50a will transmit driving force through the radial arm 34 causing the driven shaft 35 to rotate in a clockwise direction.

Now, however, as soon as the driving force in either direction is released, the brake shoe 25 will tend to spring outwardly and bring the abutments 26 and 27 to their separated position as shown in Fig. 3. The brake shoe 25, when in rest condition, will have a normal braking force sufficient in most cases to prevent turning of the winch drum or spool 12 by virtue of force supplied thereto. If more than normal force is applied to the winding drum 12 pressure will be transmitted in a reverse direction through the arm 34 to the recessed top of wedging member 30. The member 30 will then be caused to rock within the limits of the clearance provided between the abutments to the left of the position shown in Fig. 3, the rigid arm 34 simultaneously moving to the left to effect the wedging action. The more force that is applied to the arm 34, the more torque will be applied to the wedging member and consequently the more outward binding force will be transmitted through brake shoe 25 to the annular braking surface 21.

Again, if the reverse force applied to the driven mechanism is such as to tend to create turning of driven shaft 35 in a counterclockwise direction, then the same binding or locking action will be created by virtue of the member 30 rocking in the opposite direction but still effecting a spreading of the abutments 26 and 27 as before described.

A notable attribute of our invention is the ability of the driving force to simultaneously release or loosen the binding force of brake shoe 25 and transmit the driving force against resistance from the winch drum 12 through the arm member 34. However, when the driving force is released and it is attempted to reverse the movement of the parts through torque created in the driven shaft 35, the same members will not respond to reverse the movement. On the contrary, the brake shoe 25 remains exactly in the position which it had attained at the time the driving force on handle 45 was released and excessive forces on the winch drum 12 will only serve to more firmly bind the brake shoe and insure positive braking action at all times.

It may thus be seen that we have devised an unusually simple but effective drive and brake mechanism which is capable of supplying a driving connection to a driven shaft while automatically releasing an interposed brake element, yet serving to instantaneously set the brake device when driving force is released, the safety and positive character of the action being increased proportionately to the amount of force applied to the driven shaft.

It will, of course, be understood that various changes may be made in the form, details, arrangement and proportions of the parts without departing from the scope of our invention.

What we claim is:

1. A drive and brake mechanism for winches and the like comprising a stationary brake drum, a driven shaft axially disposed with respect to the brake drum, a rotatable brake shoe in inner circumferential relation to said brake drum, said brake shoe arcuately terminating in abutments lying in spaced relation one with the other, a wedging member loosely fitted between said abutments and being movable into simultaneous wedging engagement with said abutments to urge the same apart and cause increased braking between the shoe and drum, a radial interconnection between said driven shaft and said wedging member, and rotary driving means such as a manual crank axially mounted with respect to said brake drum and having a driving relation with at least one of said abutments whereby, upon actuation of said driving means against said one abutment, said brake shoe will be released from braking engagement with the brake drum and said driving means will simultaneously therewith drive said drive shaft through the radial interconnection, rotation of said driven shaft being prevented upon release of the driving force upon said radial interconnection by virtue of wedging action applied between said abutments.

2. A drive and brake mechanism for winches and the like comprising, a rigid brake drum, a driven shaft journaled axially with respect to the brake drum, an arcuate brake shoe of continuous length and resiliently stressed outwardly into circumferential contact with the inner surface of said brake drum, said arcuate brake shoe terminating in abutment members in closely separated and opposed relation, a wedge block lying between said abutments and normally in close separation therebetween and unattached to said brake drum, a radial arm rigidly secured to said driven shaft in alignment within said brake drum and rockably engaging said wedge block for applying additional outward force to said arcuate brake shoe when rocked in either direction into wedging engagement with said abutments, and driving means mounted for independent rotation axially of said brake drum and having a radially extending boss provided with opposed bearing surfaces each in alignment with a respective abutment on said brake shoe in opposed relation with said wedge block for exerting releasing force to one of said brake shoe abutments and further having a pair of spaced bearing surfaces lying in opposed close clearance one at each side of said radial arm, whereby driving engagement with one of said brake shoe abutments will release said brake shoe and simultaneously impart rotation through bearing engagement with said radial arm to rotate said driven shaft, and release of said driving engagement will permit said brake shoe to spring outwardly into frictional engagement with said brake drum and when a reverse torque is applied to said driven shaft will increase the braking force between said brake shoe and said brake drum through rocking and wedging of the wedge block between said brake shoe abutments.

3. A drive and brake mechanism for winches and the like, comprising a supporting structure, a stationary brake drum on the supporting structure, a driven shaft journalled axially of the brake drum, a rotatable brake shoe extending around and normally engaging the inner periphery of the drum in braking relation, said brake shoe having spaced end portions with opposed abutments thereon and movable divergently and convergently to respectively increase and decrease braking pressure between the shoe and drum, a wedging member loosely fitted between said abutments and being movable into simultaneously wedging engagement with said abutments to urge the same divergently, a radial member fixed on the driven shaft adjacent the wedging member, means connecting said radial member with the wedging member whereby to move the wedging member against the abutments when the radial member is moved in response to power from the shaft, and rotary driving means on the supporting structure and axially of the brake drum and having driving relation with at least one of the abutments, urging the same convergently with respect to the other of the abutments to produce rotation of the shoe and of the wedging member and radial member for driving said shaft, whereby to normally prevent rotation of the shaft except under influence of the driving means, and to increase the braking to prevent rotation of the shaft when direction of power transmission through the shaft is reversed.

References Cited in the file of this patent
UNITED STATES PATENTS

| | | |
|---|---|---|
| 1,408,209 | Kleber | Feb. 28, 1922 |
| 1,629,277 | Koeb | May 17, 1927 |